UNITED STATES PATENT OFFICE.

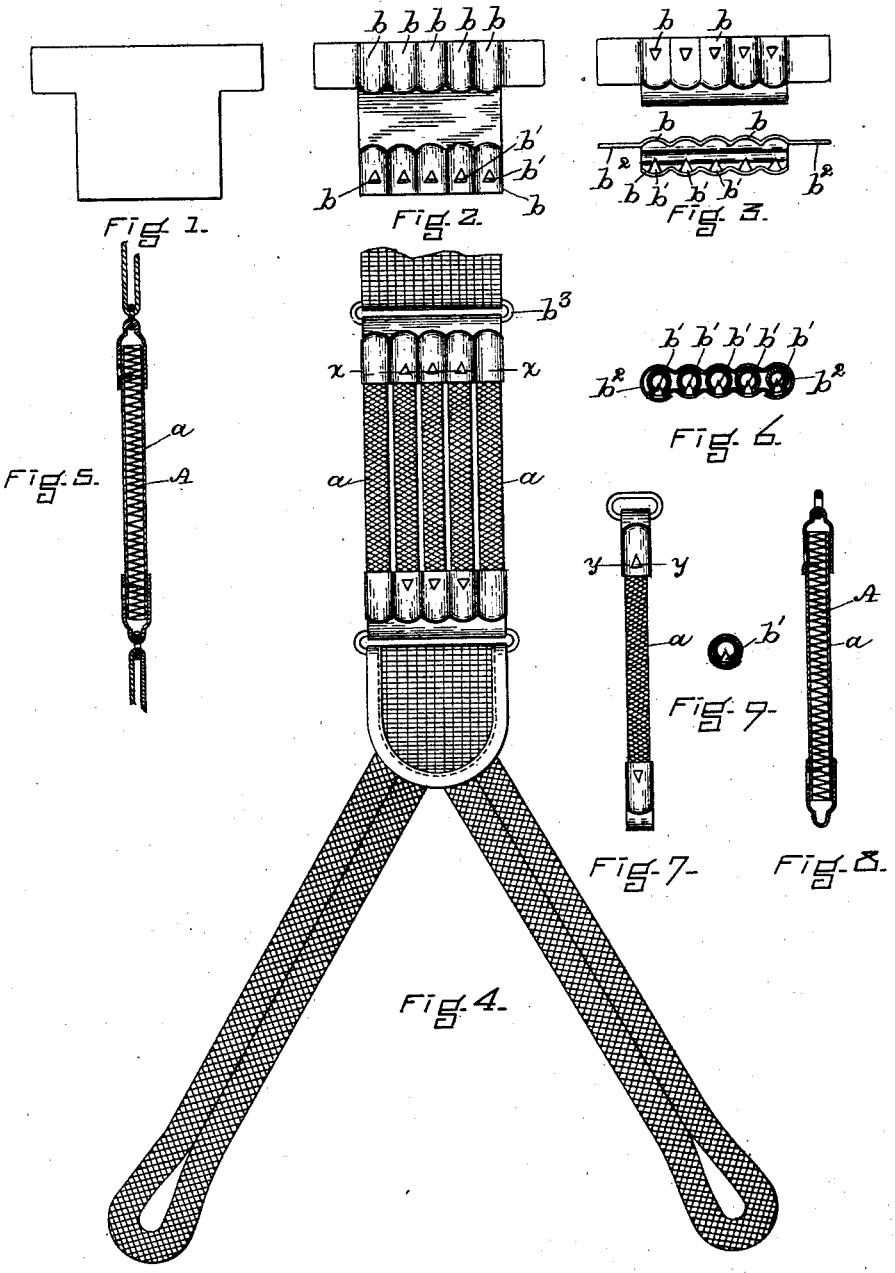

THOMAS O. POTTER, OF BOSTON, MASSACHUSETTS.

ADJUSTING SPRING-STRAP.

SPECIFICATION forming part of Letters Patent No. 367,727, dated August 2, 1887.

Application filed May 19, 1887. Serial No. 238,720. (No model.)

*To all whom it may concern:*

Be it known that I, THOMAS O. POTTER, of Boston, in the county of Suffolk and State of Massachusetts, a citizen of the United States, have invented a new and useful Improvement in Adjusting-Straps for Garments or other Articles of Wear, of which the following is a full, clear, and exact description, reference being had to the accompanying drawings, forming a part of this specification in explaining its nature.

The invention is an improvement upon that described in my Patent No. 212,400, dated February 18, 1879; and it consists, especially, in an elastic strap for garments or similar purposes, comprising one or more springs, preferably wire coils, each of which is covered by a fibrous jacket or covering braided upon the spring, and the ends of which jacket or jackets, together with the ends of the spring or springs, are held in or by a metal housing having prongs which extend through the fibrous jackets into the springs and serve to firmly attach the ends of the springs and jackets to the metal housings, and also to prevent the jackets or fibrous coverings from fraying or unraveling.

In the drawings, Figures 1, 2, and 3 illustrate the manner of making or forming a metal holder or housing for receiving and holding the ends of a number of jacketed springs of the character specified. Fig. 4 represents the complete strap. Fig. 5 is a longitudinal section through one of the springs. Fig. 6 is a horizontal section upon the line $x\,x$ of Fig. 4. Fig. 7 is a view representing the invention as applied to a strap having one jacketed spring only. Fig. 8 is a longitudinal section thereof. Fig. 9 is a horizontal section upon the line $y\,y$ of Fig. 7.

Referring to the drawings, A represents springs made of wire coil, and $a$ the fibrous covering or jacket thereof, which is braided upon the springs.

In manufacturing the jacketed spring the the jacket is braided upon the spring in long sections, and the covered spring is then cut into the desired lengths. Each end of the jacketed spring is then covered by a metal sleeve or section of a sleeve, which has a fastening-prong which extends from the side of the sleeve through the jacket into the spring, and which is integral with the sleeve. Where several jacketed springs are used in forming the strap, as represented in Fig. 4, the metal sleeves are connected with each other, and preferably made from one metal plate, cut or formed to the shape represented in Fig. 1, and then provided by suitable dies with half-round depressions $b$, extending from the lower and upper edges thereof, and the prongs $b'$ punched to extend inward into the sleeves. The plate thus formed is then bent midway its width to bring the two partially-formed sections opposite each other, as represented in Fig. 3, and the two sections are then united to each other by the wings $b^2$, which are caused to be folded or turned about the ends of the holder or housing, as represented in Fig. 6. Before the two parts of the plate are brought together the ends of the jacketed springs to be fastened thereto and thereby are placed upon one part of the plate, so as to be fastened thereto upon the bringing together of its two sides, and the wire loop or other device used for connecting the flexible strap with some other portion of the garment or article of wear is also placed on the plate, so that when the two sections are folded together to embrace the ends of the springs and jackets the loop shall also be secured in place to the plate, as represented in Figs. 4 and 5.

In Figs. 7 and 8 I have represented an adjusting-strap having a single spring and jacket and a metal holder or housing at each end of the character described.

I would say that the invention is not limited to an adjusting-strap having jacketed metal springs, as jacketed rubber springs or springs of any other substance covered with braided fibrous material may also be used.

It will be seen that this manner of finishing ends of jacketed springs is very desirable, in that it affords a cheap way of strongly securing the ends of the spring and of the jacket to their metal housings, and at the same time holds the ends of the braided jacket in a manner that prevents them from giving at their ends and from unraveling; and this is very essential, because the braided jackets not only serve to cover or protect the springs, but also as stays for limiting the extent of their movement.

I am aware that springs have been covered with woven fabric or covering, as described in the Curtis patent, No. 149,727, dated April 14, 1874, and in Patent No. 238,101, dated February 22, 1881, and I would not be understood as broadly covering this feature.

Having thus fully described my invention, I claim and desire to secure by Letters Patent of the United States—

1. An elastic adjusting-strap for garments and similar uses, consisting of one or more springs, each of which is covered with a braided fibrous jacket, and a housing for uniting the end or ends thereof by one or more prongs made integral therewith and extending into the jacket and spring, as and for the purposes described.

2. The combination, in an adjustable strap for garments and other similar uses, of a plate having one or more sleeves, a prong, $b'$, for each sleeve integral with the plate, and a jacketed spring or springs, the end or ends of which are inclosed by said sleeve and are fastened thereto by said prong or prongs, as and for the purposes described.

THOMAS O. POTTER.

In presence of—
  F. F. RAYMOND, 2d,
  FRED. B. DOLAN.